(12) United States Patent
Patterson et al.

(10) Patent No.: US 6,356,197 B1
(45) Date of Patent: *Mar. 12, 2002

(54) ELECTRONIC ARTICLE SURVEILLANCE AND IDENTIFICATION DEVICE, SYSTEM, AND METHOD

(75) Inventors: Hubert A. Patterson; Ming-Ren Lian, both of Boca Raton, FL (US)

(73) Assignee: Sensormatic Electronics Corporation, Boca Raton, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 09/541,419

(22) Filed: Apr. 3, 2000

(51) Int. Cl.[7] ............................................. G08B 13/14
(52) U.S. Cl. ............................... 340/572.1; 340/572.5
(58) Field of Search ................... 340/572.1, 572.4, 340/572.5, 551, 562, 825.44, 572.3

(56) References Cited

U.S. PATENT DOCUMENTS

| | | | |
|---|---|---|---|
| 3,810,147 A | | 5/1974 | Lichtblau .................... 340/280 |
| 4,249,167 A | * | 2/1981 | Purinton et al. ............ 340/572 |
| 4,413,254 A | | 11/1983 | Pinneo et al. ............... 340/572 |
| 4,656,463 A | * | 4/1987 | Anders et al. .............. 340/572 |
| 4,736,207 A | | 4/1988 | Siikarla et al. ............. 343/895 |
| 4,745,401 A | * | 5/1988 | Montean ..................... 340/572 |
| 5,030,940 A | * | 7/1991 | Siikarla ..................... 340/572 |
| 5,589,820 A | * | 12/1996 | Robinson et al. ........... 340/572 |
| 5,748,085 A | * | 5/1998 | Davis et al. ................ 340/572 |
| 5,812,065 A | | 9/1998 | Schrott et al. ......... 340/825.54 |
| 5,859,587 A | | 1/1999 | Alicot et al. ................ 340/572 |
| 5,994,899 A | | 11/1999 | Mohri ........................ 324/260 |
| 6,169,483 B1 | * | 1/2001 | Ghaffari et al. .......... 340/572.1 |
| 6,177,870 B1 | * | 1/2001 | Lian et al. ................ 340/572.5 |

OTHER PUBLICATIONS

Jiang, et al., A New Giant Magneto–Impedance Head Using Magnetic Microstrip Lines, IEEE Transactions on Magnetics, vol. 34, No. 4, Jul. 1998, p. 1339–1341.

U.S. application No. 09/229,185, Lian et al., filed Jan. 13, 1999.

* cited by examiner

Primary Examiner—John A. Tweel
(74) Attorney, Agent, or Firm—Rick F. Comoglio; Paul T. Kashimba (57) ABSTRACT

An electronic article surveillance and identification tag and system is provided. The tag couples energy from a radiated energy source, which comprises first and second radiated signals. A mixing member in the tag mixes the first and second signals to produce a sideband of the first signal, which is re-radiated by the tag. The mixing member is activated by a controller that switches the mixing member into and out of the circuit according to a code stored within the controller that is associated with an article to be identified. As the mixing member is activated and deactivated, the sideband is radiated in a sequential manner according to the stored code. A receiver detects the sideband, and a decoder recovers the stored code according to the sequence of received sideband emissions from the tag.

22 Claims, 6 Drawing Sheets

ELECTRONIC ARTICLE SURVEILLANCE AND IDENTIFICATION DEVICE, SYSTEM, AND METHOD

CROSS REFERENCES TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

This invention relates to electronic article surveillance and electronic article identification devices, and more particularly to an electronic article surveillance tag that includes electronic article identification, and an associated system and method.

2. Description of the Related Art

It is well known to provide electronic article surveillance (EAS) systems to prevent or deter unauthorized removal of articles from a controlled area. In a typical system, tags designed to interact with an electromagnetic field located at the exits of the controlled area are attached to articles to be protected. If a tag is brought into the field or "interrogation zone", the presence of the tag is detected and appropriate action is taken, such as generating an alarm.

There are several types of EAS systems presently available that detect EAS tag signals by harmonic or field disturbance detection. U.S. Pat. No. 3,810,147 discloses an EAS marker or tag that includes an LC resonant circuit. The tag is typically interrogated by transmitting a swept frequency including the resonant frequency of the tag. The tag is detected by a receiver in the interrogation zone that detects a change in the interrogation field at the tuned frequency due to the resonance of the LC circuit. Manufacturing a tag with a precise resonant frequency requires stringent manufacturing tolerances, which can result in a more expensive tag. To manufacture a more affordable tag, manufacturing tolerances are relaxed resulting in a resonant frequency that may shift slightly from tag to tag. To interrogate the more affordable tags with variances in resonant frequency, a swept frequency is transmitted, which can require higher power usage than transmitting a discrete frequency.

An improved tag and associated EAS system utilizes an LC resonant circuit that includes a magnetic material that exhibits a "giant magneto-impedance" (GMI) effect when exposed to a magnetic field. As fully described hereinbelow, a GMI effect is a substantial change in impedance of the magnetic material when exposed to a magnetic field. The magnetic material can be a wire or ribbon and is connected to the LC circuit by soldering, plating, or etching to form part of the circuit. Additional information on magneto-impedance material can be found in a various published sources, such as U.S. Pat. No. 5,994,899.

A transmitted low frequency magnetic field interacts with the magnetic material to produce the GMI effect. The GMI effect due to the magnetic field causes the impedance of the magnetic material to change. The change in impedance of the material changes the resistance of the material causing the quality factor (Q) of the LC circuit to change. The change in Q results in a change in the output level of the LC circuit at resonance. In effect, the LC circuit and magnetic material modulate the transmitted resonant or carrier frequency with the low frequency magnetic field. The tag thus produces sidebands of the resonant frequency, which can be detected by suitable detection equipment.

The tag is interrogated by simultaneously transmitting a first signal at the LC circuit's tuned resonance frequency and a second signal comprising a low frequency alternating magnetic field. Because of the magnetic material, the tag mixes the resonant "carrier" frequency and the low frequency magnetic field, forming sidebands of the resonant frequency that can be detected by a suitable EAS receiver.

Sideband detection is an improvement over harmonic or field disturbance detection. In the detection of harmonics or a change in the fundamental, the carrier signal itself is a source of noise. The signals that are being detected are small, so even a small amount of carrier noise masks the desired signal. With sideband detection, the carrier frequency is not a noise source that masks detection of the sidebands. In addition to the sideband generating tag described above, U.S. Pat. No. 4,736,207, discloses a microwave tag which includes a tuned dipole antenna and a nonlinear circuit device that mixes two interrogate signals and re-radiates the first signal modulated by the second signal.

In addition to EAS, there is presently a desire to expedite and facilitate the removal of articles from controlled areas by gathering identification data about the article. As used herein, identification data means any data to be gathered, stored, or used pertaining to an article or object to be protected, monitored, retained, sold, inventoried, or otherwise controlled or distributed in some manner. For example, retail establishments desire to gather information pertaining to article identification, price, and pertinent inventory control data. Presently, bar codes provide some of this type of data. However, bar codes can only provide a small amount of read only data, and the bar code reader or scanner must be visually aligned with the bar code to properly read the bar code attached to the article, slowing the checkout or inventory process.

Radio frequency identification (RFID) utilizes radio frequency (RF) interrogation and reply frequencies to perform electronic article identification (EAI) functions. In RFID, a tag that responds with RF identification information, in response to an RF interrogation signal, is attached to an article to be identified. At present, RFID tags are well suited to provide article identification information, pricing information, inventory control, and can receive and store information such as the date and place of sale, sales price, and article manufacturing authenticity information. However, RFID tags are not well suited to EAS applications because of limited detection range as well as being prone to shielding and detuning when proximate certain materials, which can result in missed EAS detection. Presently EAS tags and RFID tags must both be attached to an article if identification and protection of the article are desired.

U.S. Pat. No. 5,859,587 discloses an RFID and EAS tag integrated within the same tag housing. The RFID and EAS functions in the '587 disclosure are electrically separate, discrete functions that are located within one enclosure. There is presently a desire for a tag that combines both EAS and EAI functions.

BRIEF SUMMARY OF THE INVENTION

In accordance with the present invention, there is provided an electronic article surveillance and identification tag and system. In a first aspect of the present invention, the tag couples energy from a radiated energy source, which includes first and second radiated signals. A mixing member in the tag mixes the first and second signals to produce a sideband of the first signal, which is re-radiated by the tag. A controller switches the mixing member into and out of the circuit according to a code stored within the controller that is associated with an article to be identified. As the mixing member is switched in and out, the sideband produced by the tag will be radiated in a sequential manner according to the stored code. A receiver detects the sideband, and a decoder recovers the stored code according to the sequence of received sideband emissions from the tag.

Radiated energy received by the tag provides power for the controller. As long as the controller is powered, the tag will continue to re-radiate the generated sideband in a sequence corresponding to the stored data code. When the coupled energy drops below a pre-selected minimum level, the controller becomes deactivated. When the controller is deactivated, the mixing member remains in the circuit and continues to mix the first and second signals to produce the sideband. The sideband is continually generated and re-radiated until the tag is removed from the radiated energy field. The tag thus performs as an EAS tag and an EAI tag when the coupled energy is above a pre-selected minimum level, and continues to perform as an EAS tag when the coupled energy drops below the pre-selected minimum level thus deactivating the controller.

In one embodiment of the present invention, an inductor and a capacitor forming an LC circuit having a pre-selected resonance frequency couples the radiated energy, which contains the first and second signals. The mixing member is a segment of magnetic material exhibiting a GMI effect when exposed to a magnetic field. A GMI effect is a substantial change in the material's impedance when exposed to a magnetic field, as fully described hereinbelow.

In one implementation, the magnetic member is a wire or ribbon connected to the LC circuit that changes resistance when exposed to an alternating magnetic field. The change in resistance of the magnetic member changes the Q of the LC circuit. When the radiated energy received by the LC circuit includes its resonance frequency and a lower frequency magnetic field, the magnetic member changes the Q of the circuit resulting in modulation of the two signals. Modulation or mixing of the two signals generates sidebands of the resonance frequency, which are then detectable in conventional manner. The controller controls switching the mixing member into and out of the circuit.

The controller receives power from the LC circuit through a power rectifier, and includes a switch connected across the magnetic member that shorts the magnetic member whenever the switch closes. Switch control is provided by a logic control unit that is connected to a non-volatile memory that stores a pre-selected code associated with an article to be identified. Sideband generation stops when the switch closes and shorts the magnetic member. The sideband can thus be sequentially generated by sequentially closing and opening the switch. If the switch closure corresponds to the digital data code stored in the non-volatile memory, the sideband will be generated according to the stored code. A detector receives the sideband and a decoder can reconstruct the stored digital code from the detected sideband emissions. When the coupled power to the rectifier drops below a pre-selected minimum level, the power rectifier deactivates the controller. The switch is normally open (NO) and remains in the open state when the controller is deactivated. Thus the magnetic member continues to be in the LC circuit mixing the two signals when the controller is deactivated, and the tag functions as an EAS tag.

The tag can be made of discrete components or made on a substrate having conductive layers formed thereon to provide the inductor, and the capacitor. The magnetic member and/or controller may also be formed on the substrate, or may be separate and connected to the components on the substrate.

In an alternate embodiment of the present invention, a dipole antenna tuned to the is microwave frequency band couples the radiated energy. The mixing member is a diode, or other non-linear circuit device having electrical characteristics similar to a diode. The diode is activated by an electric field, and modulates two signals together in a well-known manner, see e.g., U.S. Pat. No. 4,736,207.

The controller switch is connected across the diode and performs as described hereinabove for the magnetic member. When the switch is open the tag containing the diode and dipole antenna receives and modulates the two radiated signals forming the sidebands, which are re-radiated by the tag. When the switch is closed, the diode is shorted, and the sidebands are not generated. As above, the switch can be sequentially opened and closed according to the stored digital data code. A detector can detect the sideband and a decoder can reconstruct the digital data code associated with the article to be identified.

When the coupled energy falls below a pre-selected minimum level, the controller is deactivated and the switch remains open. The sidebands are continually generated while the tag remains in the radiated energy field of the two signals. Thus, when the controller is deactivated, the tag behaves as a conventional microwave EAS tag providing theft deterrence.

According to a second aspect of the present invention, an EAS and EAI system is provided that transmits a first and second signal at a first and second frequency, respectively, which are mixed by a tag having a signal mixing member which generates and re-radiates sidebands of the first frequency modulated by the second frequency. The tag includes a controller powered by the transmitted signals that switches on and off the mixing member according to a stored data code that is associated with an article to be identified. A detector detects the re-radiated sidebands, and a decoder decodes the data code according to the received sidebands. The data code is stored in non-volatile memory in the tag, and can be changed by transmission of a proper reprogramming code to the tag. The non-volatile memory can be an electronically erasable programmable read-only memory (EEPROM) or equivalent device.

In a first implementation, the tag includes an LC circuit and a mixing member that is made of a magnetic material that exhibits a GMI effect when exposed to a magnetic field. The first signal is radiated at the resonant frequency of the LC circuit and the second signal, which is at a lower frequency than the first frequency, is the magnetic field that provides the GMI effect.

In a second implementation, the tag includes a dipole antenna and a diode signal mixing member, which is activated by an electric field. The resonant frequency of the tag is in the microwave frequency band. The second signal is lower in frequency than the first signal and produces the electric field that activates the diode.

In a third aspect of the present invention, a method of operation of an EAS and EAI system is provided including providing a tag which includes a tuned circuit and a signal mixing member. Transmitting a first signal at a resonant frequency of the tuned circuit. Transmitting a second signal at a frequency that is lower than the first signal, the second signal activating the signal mixing member. Sequentially turning on and off the signal mixing member according to a pre-selected data code associated with an article to be identified. Detecting a sideband of the first signal, the sideband being generated by the signal mixing member mixing the first and the second signals. And, decoding the pre-selected data code from the detected sideband.

Accordingly, it is an object of the present invention to provide an electronic article surveillance tag that also provides electronic article identification such as RFID.

It is a further object of the present invention to provide an EAS and RFID tag that includes a signal mixing member that mixes two signals to produce a detectable sideband signal, and includes a controller that sequentially switches on and off the mixing member according to a stored data code associated with an article to be identified.

It is another object of the present invention to provide an EAS and RFID system to interrogate at two frequencies, detect a sideband signal, and decode from the detected sideband signal a stored data code associated with an article to be identified.

It is yet a further object of the present invention to provide a method of operation of an EAS and RFID system that interrogates at two frequencies, detects a sideband signal, and decodes from said detected sideband signal a stored data code associated with an article to be identified.

Other objectives, advantages, and applications of the present invention will be made apparent by the following detailed description of the preferred embodiment of the invention.

DETAILED DESCRIPTION OF THE INVENTION

Figure 1:
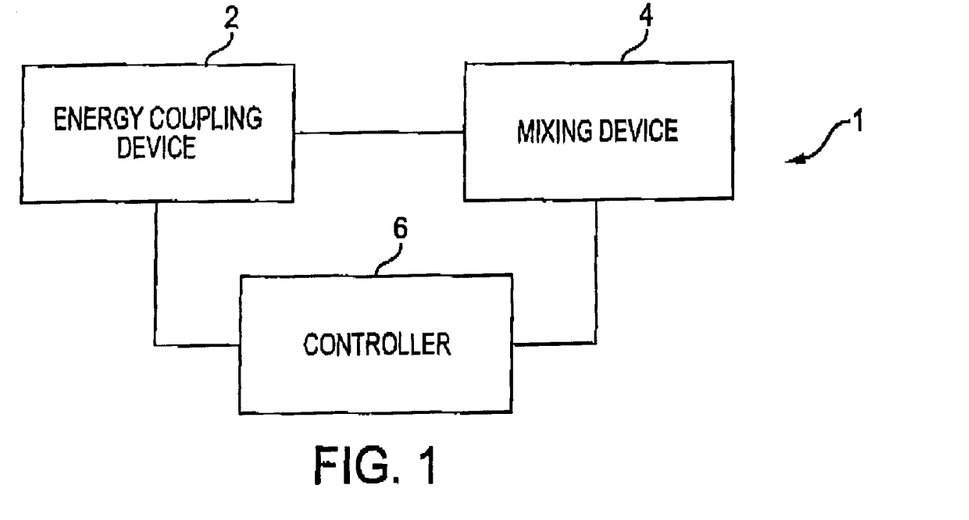
FIG. 1 is a schematic block diagram of the present invention.

Referring to FIG. 1, the present invention is generally illustrated at 1 comprising an energy coupling device 2 for receiving and transmitting radiated energy, a mixing device 4 for mixing two signals, and a controller 6 which controls operation of the mixing device 4 according to a preprogrammed code. Energy coupling device 2 provides power for controller 6.

Figure 2:
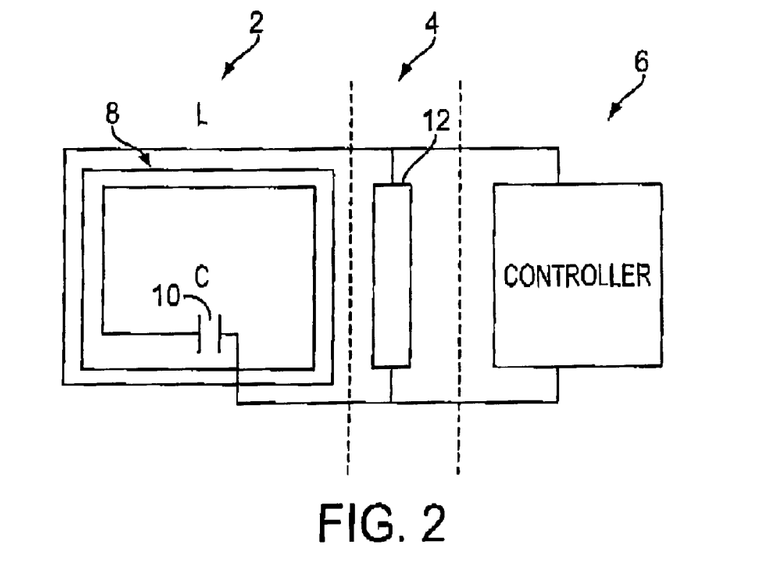
FIG. 2 is a schematic block diagram of a first embodiment of the present invention.

Referring to FIG. 2, in one embodiment of the present invention, a resonant LC circuit comprising inductor 8 and capacitor 10 forms the energy coupling device 2. A magnetic member 12 made of a magnetic material, fully described hereinbelow, that exhibits a giant magneto-impedance effect when exposed to a magnetic field forms the mixing device 4, which is connected in series within the LC loop formed by inductor 8 and capacitor 10. Controller 6 is connected in parallel across magnetic member 12.

Figure 3:
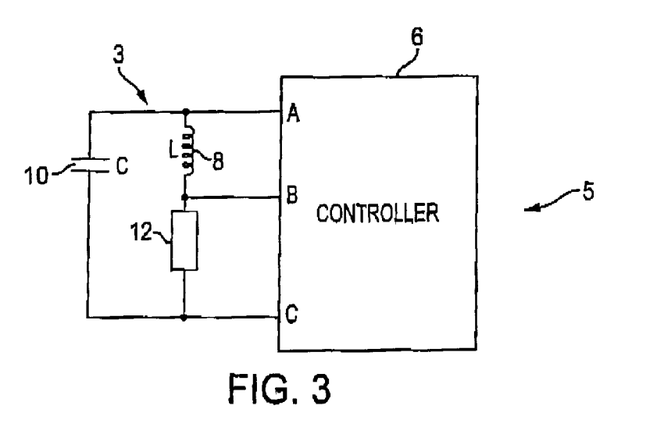
FIG. 3 is a schematic diagram of the embodiment of FIG. 2.

Referring to FIG. 3, an implementation of FIG. 2 is illustrated as tag 5 in which inductor 8 and capacitor 10 forms LC resonant loop circuit 3. Inductor 8 and capacitor 10 are selected so the resonance frequency of LC circuit 3 can be nearly any frequency, with 13.56 MHz and 25.50 MHz being two specific examples selected herein that are compatible with current RFID systems. Magnetic member 12 is connected in series in the LC resonant loop 3 formed by inductor 8 and capacitor 10, and forms a variable resistive element due to the GMI effect.

A GMI effect is a substantial change in the material's impedance when exposed to a magnetic field. A magneto-impedance effect is generally a few percent change in impedance with a magnetic field. The effect is "giant" when the change is relatively larger, such as a change in impedance of about 10 times when exposed to a magnetic field. The effect's magnitude is affected by the geometry of the material, and the frequency of the magnetic field.

The magnetic member 12 may take the form of a 6-cm length of a suitable amorphous material, such as cobalt-based wire, having a diameter of 116 microns. The amorphous cobalt-alloy wire may be formed by a conventional technique such as casting in rotating water or melt extraction. The permeability of the wire may be enhanced and a circumferential anisotropy developed by current-annealing the wire. A thin film, which has GMI characteristics may be employed instead of cast amorphous wire.

Magnetic member 12 is a wire or ribbon connected to LC circuit 3 that changes impedance when exposed to an alternating magnetic field. The change in impedance changes the resistance of magnetic member 12 and changes the Q of the LC circuit 3. The transmitted energy received by LC circuit 3 includes the LC circuit's resonant frequency and a lower frequency magnetic field. The low frequency magnetic field causes the magnetic member 12 to change resistance and thus change the Q of LC circuit 3. The change in Q from the low frequency magnetic field results in modulation of the resonant frequency and the low frequency signals. Modulation or mixing of the two signals generates a sideband of the resonance frequency, which is re-radiated by the tag and detectable in conventional manner.

Figure 4:
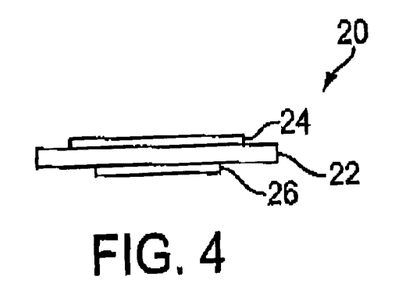
FIG. 4 is a representative side elevational view of a tag made in accordance with the embodiment of FIG. 3.

FIG. 4 is a side view of tag 20, which includes the resonant circuit 3 shown in FIG. 3. Tag 20 illustrates one implementation of tag 5. Structural support for tag 20 is provided by a conventional substrate 22. A conductive trace layer 24 formed on the top side of the substrate 22 may correspond to all elements of the resonant circuit 3 except for one plate of the capacitor 10. Magnetic member 12 and controller 6, although not separately shown, are included in conductive trace layer 24. Alternately, magnetic member 12 and/or controller 6 can be separate components connected to layer 24 (not shown).

A second conductive layer 26, provided at an opposite (bottom) side of the substrate 22, constitutes the portion of capacitor 10 not included in the top conductive layer 24. An alternative to placing the second conductive layer 26 on the opposite side of the substrate 22 from the first conductive layer 24, a dielectric layer (not shown) can be formed on top of the first conductive layer 24, and second conductive layer 26 is formed on top of the dielectric layer.

Figure 5:
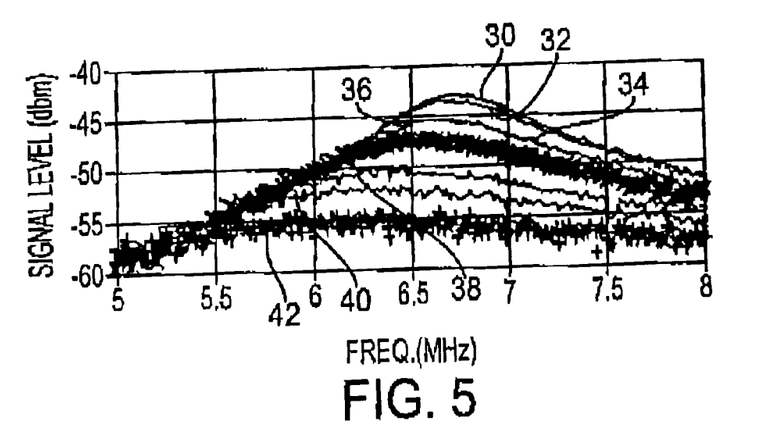
FIG. 5 is a graph illustrating signal traces for a tag resonant circuit for use in the embodiment of FIG. 3 for representative levels of a DC bias magnetic field applied to the tag.

FIG. 5 illustrates how variations in the level of a DC bias magnetic field, applied along the length of the magnetic member 12, affect the level of a signal output from tag 5 in response to a swept interrogation signal. Seven traces are shown in FIG. 5, corresponding, respectively, to seven different levels of the DC bias magnetic field. The top trace, which is labeled with reference numeral 30, corresponds to a bias level of 0.11 Oersted (Oe). The next trace, labeled 32, corresponds to a 0.28 Oe bias level. The next trace, labeled 34, corresponds to a 0.40 Oe bias field level. Trace 36, corresponds to a bias field level of 0.49 Oe. The succeeding trace, indicated by reference numeral 38, is for a 0.63 Oe bias field level. Trace 40 corresponds to a bias field level of 0.71 Oe, and the bottom trace, indicated by reference numeral 42, corresponds to a bias field level of 0.83 Oe.

FIG. 5 indicates that at a very minimal bias field, of about 0.11 Oe or below, tag 5 exhibits substantial resonance at its tuned frequency, which in this example is 6.725 MHz. It should be understood that the resonant frequency can be changed to nearly any other frequency desired, such as 13.56 MHz or 25.50 MHz for compatibility with present RFID systems. As the bias field is increased by small amounts, measured in the tenths of an Oersted, the resonance of the circuit is decreased until it is substantially eliminated at a bias field level of about 0.8 Oe. The reduction in the resonance is due to the GMI effect imparted to the magnetic member 12 by the bias magnetic field. The resistance change in the magnetic member 12 changes the Q of the resonant circuit.

Figure 6:
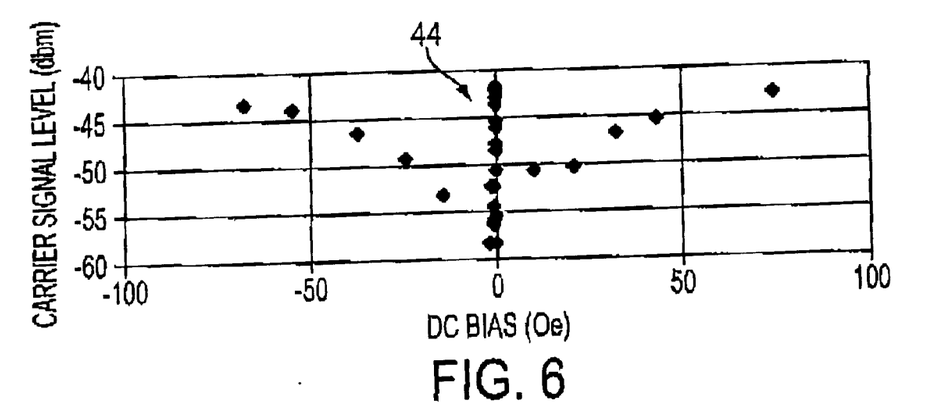
FIG. 6 illustrates carrier signal intensity levels for the tag of FIG. 5.

FIG. 6 illustrates how the signal level output from tag 5, when excited by a 6.725 MHz signal, varies over a range of bias field values measured in tens of Oersteds. A central spike indicated at 44 in FIG. 6 represents the large decrease in resonance which occurs as the absolute value of the bias field level is increased by a small amount from a substantially zero level. The amount of resonance then increases gradually as the absolute value of the bias field level continues to be increased by tens of Oersteds. At around 75 or 80 Oe, a high degree of resonance is again achieved.

Figure 7:
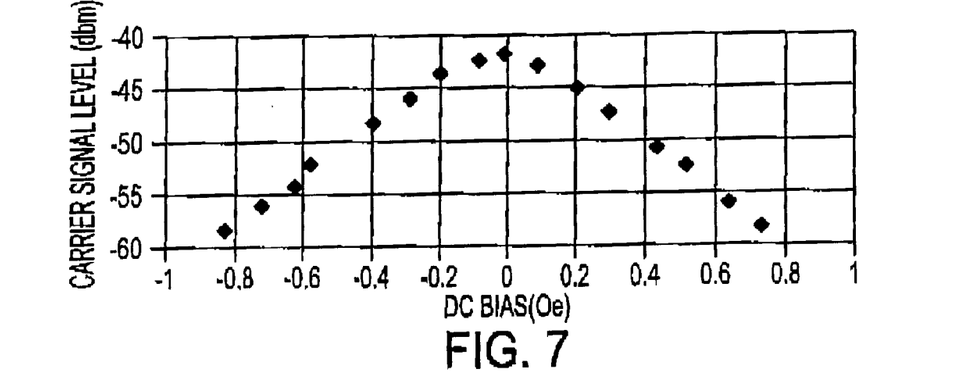
FIG. 7 illustrates a portion of the graph of FIG. 6 near the bias field origin.

FIG. 7 illustrates the portion of the graph of FIG. 6 near the spike 44, as presented on a larger horizontal scale. As also seen in FIG. 5, the signal level is reduced to a very low level as the absolute value of the DC bias field increases to about 0.8 Oe. Thus, as illustrated in FIGS. 5–7. the resonant output of tag 5 varies in amplitude according to the level of the applied magnetic field. If the applied magnetic field is a low frequency time varying field, tag 5 will produce an amplitude-modulated response with a 6.725 MHz carrier frequency modulated by the frequency of the time varying magnetic field. As well known in amplitude modulation, tag 5 produces detectable sidebands of the resonant frequency.

Figure 8:
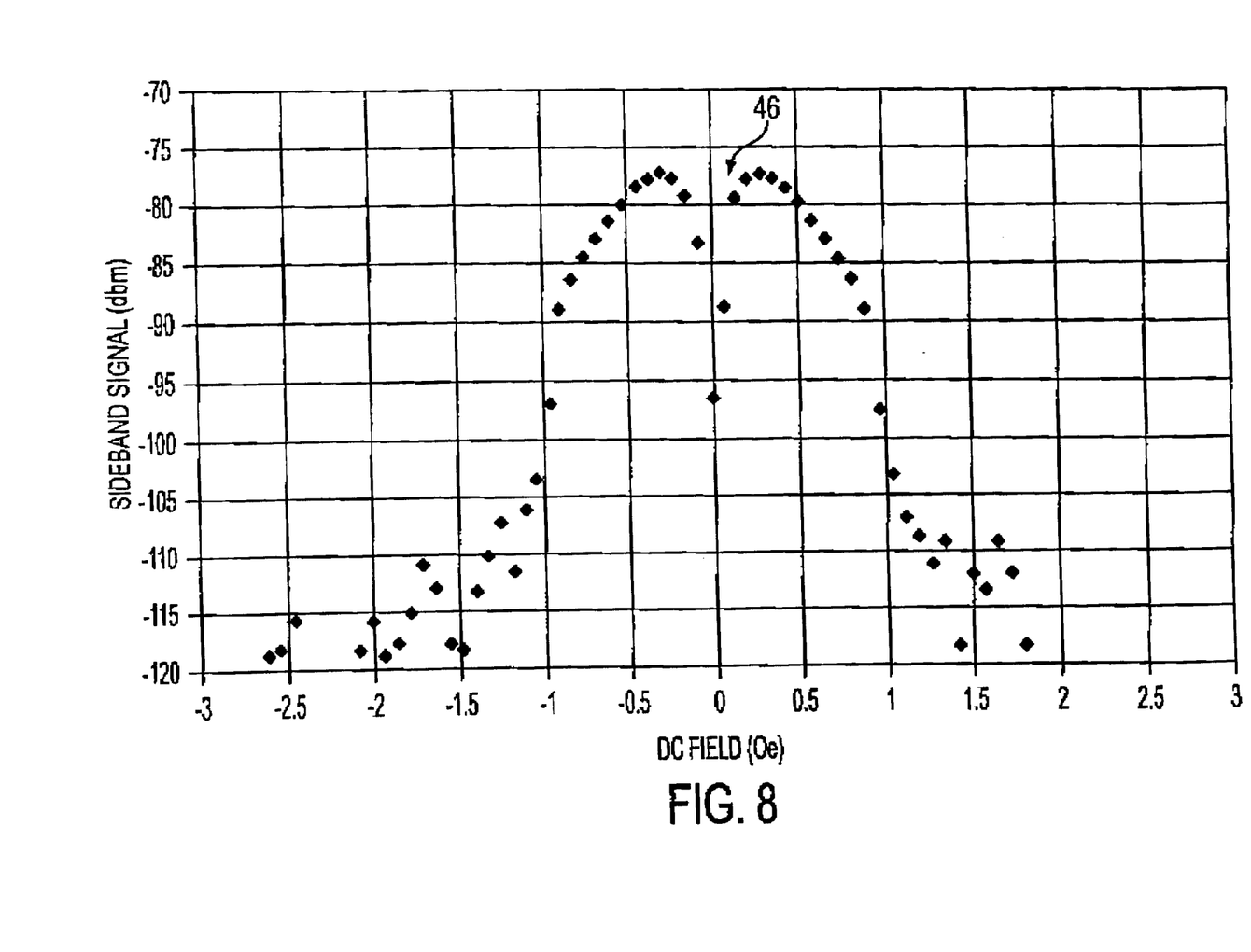
FIG. 8 illustrates the sideband signal intensity levels of the tag of FIG. 5.

FIG. 8 illustrates how the sideband signal intensity varies with changes in a bias magnetic field applied to a tag provided in accordance with the invention and excited by both a 6.725 MHz carrier signal and a 1 kHz magnetic field having a peak amplitude of 31 mOe. It will be observed that the sideband signal intensity is relatively high for bias field levels having an absolute value of 1 Oe or less, except for a trough near a zero bias field level, as indicated at 46 in FIG. 8. The trough 46 is due to the zero slope at the origin of the carrier signal intensity/bias field curve of FIG. 7. In practice, the effect of the earth's magnetic field is usually sufficient to bias the tag slightly away from the trough region 46. It will also be understood from FIG. 8 that application of a bias field of about +/−3 Oe would be sufficient to prevent the tag from generating a substantial sideband signal.

Figure 9:
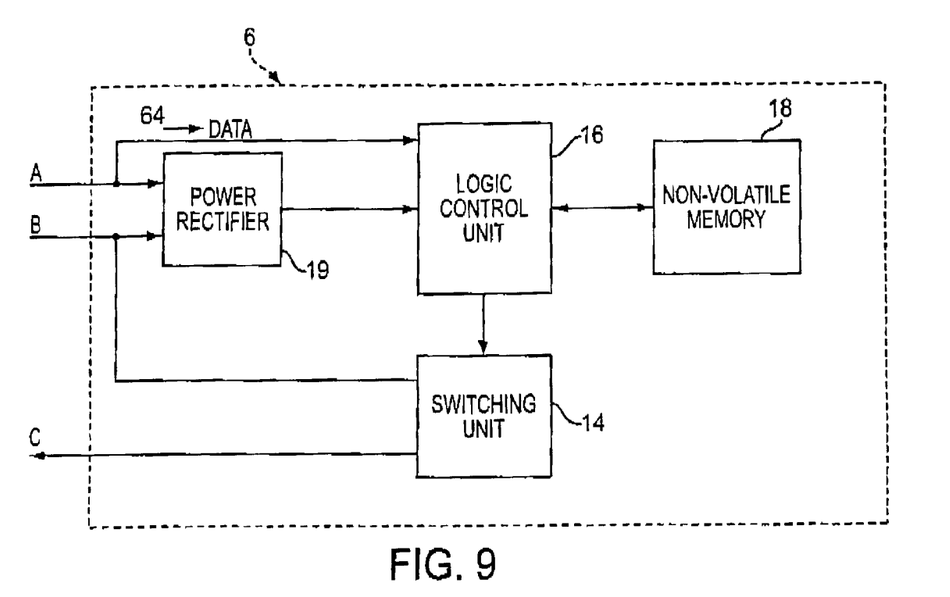
FIG. 9 is a schematic block diagram of one embodiment for a controller for use in the present invention.

Referring to FIG. 9, a preferred embodiment of controller 6 of tag 5 is illustrated and is connected across magnetic member 12 at B and C and to LC circuit 3 at A, B, and C as shown in FIG. 3. Controller 6 controls switching of magnetic member 12. Switch 14 is connected across, in parallel to magnetic member 12, at B and C, and is switched between the open state and the closed state by logic control unit 16. When switch 14 is closed, magnetic member 12 is shorted and effectively removed from LC circuit 3. When switch 14 is open, magnetic member 12 is in LC circuit 3. Logic control unit 16, opens and closes switch 14 according to a preprogrammed code stored in non-volatile memory device 18. Memory device 18 can be an electronically programmable read-only memory (EPROM), or preferably an electronically erasable programmable read-only memory (EEPROM), or equivalent device for storage of digital information.

Controller 6 is powered by a power rectifier 19 connected to LC resonant circuit 3. Power rectifier 19 provides DC power for logic control unit 16 as long as the power received from LC circuit 3 is of a sufficient level. If the power to the power rectifier 19 falls below a pre-selected minimum level, power will no longer be supplied to logic control unit 16. Switch 14 is selected to be normally open (NO) so that when power is no longer supplied to logic control unit 16, switch 14 will remain open and magnetic member 12 will remain switched into LC circuit 3.

When magnetic member 12 is switched into LC circuit 3 by opening of switch 14, tag 5 mixes the transmitted resonant frequency and low frequency magnetic field forming and re-radiating a detectable sideband. When magnetic member 12 is shorted out of LC circuit 3 by the closure of switch 14, no mixing occurs and no sideband is generated.

Figure 10A:
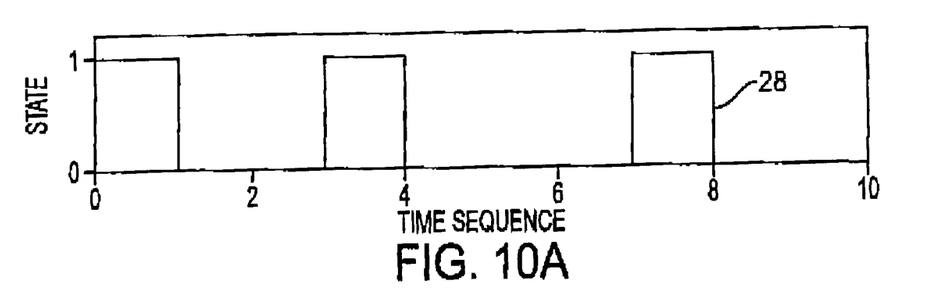
FIGS. 10A and 10B are graphs illustrating the switching and sideband generation for a tag made in accordance with the present invention.
Figure 10B:
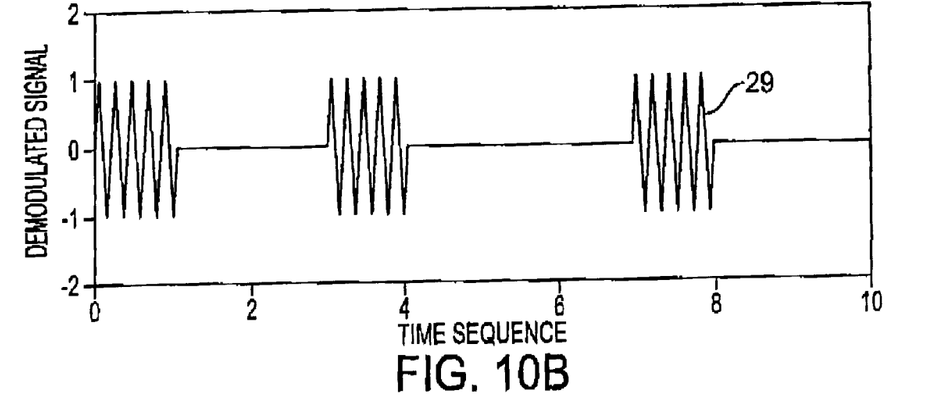

Referring to FIGS. 10A and 10B, the state of switch 14 is illustrated at 28 in FIG. 10A, and the corresponding demodulated signal received from tag 5 is illustrated at 29 in FIG. 10B. In time sequence 0-1 the switch 14 is open, and the sideband is generated. In time sequence 1-2, the switch 14 is closed and no sideband is generated. In time sequence 2-3, switch 14 is closed and no sideband is generated. In time sequence 3-4, switch 14 is open, and the sideband is generated, and so on. Logic control unit 16 controls switching, with the switching sequence being provided by a stored code in non-volatile memory 18. The stored code can be identification information associated with an article of interest.

As can be seen from FIGS. 10A and 10B, the stored digital code can easily be decoded from the detected sideband signal sequence. Tag 5 thus functions as an RFID tag as well as an EAS tag. When the switch 14 remains open, as occurs when the power received by rectifier 19 drops below a pre-selected minimum, the sideband will continue to be generated, and tag 5 will remain detectable as an EAS tag.

Figure 11:
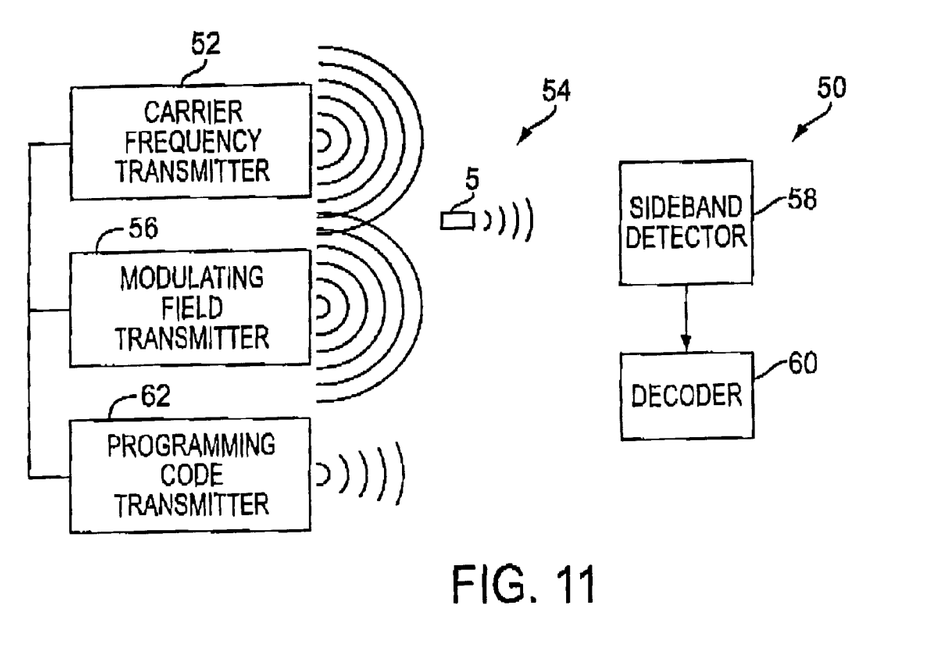
FIG. 11 is a schematic block diagram of an EAS and RFID system according to the present invention.

FIG. 11 illustrates an EAS and RFID system provided in accordance with the present invention. Reference numeral 50 generally indicates the EAS/RFID system provided in accordance with the invention. One system component is a single frequency transmitter 52, which transmits a signal at the tag's tuned frequency into interrogation zone 54. The signal generated by the transmitter 52 is selected to match the pre-selected resonant frequency to which tag 5 is tuned.

Another component of the system 50 is a modulating magnetic field transmitter 56. The transmitter 56 transmits into the interrogation zone 54 a magnetic field that alternates at a frequency which is considerably lower than the frequency of the carrier signal transmitted by the transmitter 52. For example, the frequency of the alternating magnetic field may be about 1 kHz for resonant frequencies in the megahertz range.

The transmitter 56 may generate the alternating magnetic field by a suitable antenna. It is well within the ability of those of ordinary skill in the art to design circuitry for driving the antenna to generate the alternating magnetic field.

Because of the GMI effect exhibited by the magnetic element 12 of tag 5, the Q of tag 5 is repetitively reduced at the frequency of the magnetic field generated by the transmitter 56, as described hereinabove. Consequently, the tag 5 operates to mix the frequency of the magnetic field transmitted by the transmitter 56 with the carrier signal transmitted by the transmitter 52, to form a sideband of the carrier signal. This sideband signal in interrogation zone 54 can be readily received and reliably detected by a sideband detector 58, with little likelihood of generating false alarms. The sideband detector 58 also constitutes a part of the EAS/RFID system 50 shown in FIG. 11, and can be designed without difficulty by those of ordinary skill in the art.

Sideband detection is an improvement over harmonic or field disturbance detection. In the detection of harmonics or a change in the fundamental, the carrier signal itself is a source of noise. The signals that are being detected are small, so even a small amount of carrier noise masks the desired signal. With sideband detection, the carrier frequency is not a noise source that masks detection of the sidebands.

Decoder 60 is connected to sideband detector 58 to recover the transmitted code sequence from the detected sideband. The transmitted code is preprogrammed in non-volatile memory 18 in tag 5 as described above. In a preferred embodiment, the stored digital code can be modified by a suitable programming code transmitter 62 that can transmit directly to tag 5, through carrier transmitter 52, or magnetic field transmitter 56. Referring back to FIG. 9, data 64 can be received by logic control unit 16, which handles programming control of memory 18.

Figure 12:
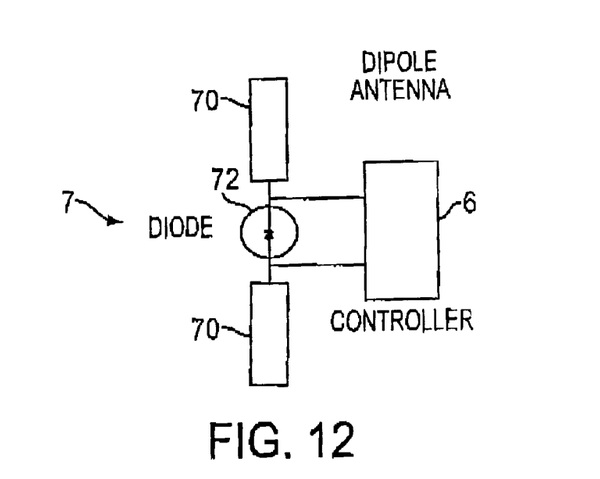
FIG. 12 is a schematic block diagram of a second embodiment of the present invention.

Referring to FIG. 12, a second embodiment of the present invention is illustrated as tag 7 in which controller 6 is utilized with a conventional microwave frequency tag as known in the art. As stated herein above, U.S. Pat. No. 4,736,207 discloses a microwave tag, which includes a tuned dipole antenna and a nonlinear circuit device that mixes two interrogate signals and re-radiates the first signal modulated by the second signal. Referring also back to FIG. 1, in the microwave embodiment, the energy coupling device 2 comprises dipole antenna 70, and the mixing device 4, which performs mixing of the two signals, comprises diode 72. Diode 72 is connected to antenna 70 in a manner well known in the art. The EAS/RFID system illustrated in FIG. 11 can be utilized with the microwave embodiment of FIG. 12, with a required shift in frequency to the microwave band of about 900 MHz to about 3 GHz, and with tag 5 replaced by tag 7.

Other EAS tags can be utilized with controller 6 as illustrated in FIG. 1, so long as an energy coupling device 2 and a mixing device 4 can be implemented. For example, in an alternate embodiment, magnetic member 12 can be implemented differently. Instead of a resistive member being utilized to change the Q of the resonant circuit, the magnetic member could be utilized to change the inductance value directly, thereby shifting the resonant frequency of the tuned circuit. The tag's resonant frequency would vary in accordance with the transmitted low frequency magnetic field. The two transmitted frequencies would thus be modulated forming the sidebands.

It is to be understood that variations and modifications of the present invention can be made without departing from the scope of the invention. It is also to be understood that the scope of the invention is not to be interpreted as limited to the specific embodiments disclosed herein, but only in accordance with the appended claims when read in light of the forgoing disclosure.

What is claimed is:

1. An electronic article surveillance and identification tag, comprising:
    energy coupling means for receiving transmitted energy and re-radiating said energy, said transmitted energy comprising a first signal at a first frequency and a second signal at a second frequency;
    means for mixing said first and said second signals together forming a sideband signal for re-radiating by said energy coupling means; and
    a controller for switching on and off said means for mixing according to a pre-selected stored data code associated with an article to be identified.

2. The tag as recited in claim 1, wherein said energy coupling means comprises an inductor and a capacitor.

3. The tag as recited in claim 2, wherein said means for mixing comprises a magnetic member connected to said inductor and said capacitor.

4. The tag as recited in claim 3, wherein said second signal is a magnetic field and said magnetic member exhibits a magneto-impedance effect by changing impedance when said magnetic field is applied to said magnetic member.

5. The tag as recited in claim 4, wherein said first frequency is about 13.56 MHz, and said second frequency is lower that said first frequency.

6. The tag as recited in claim 4, wherein said first frequency is about 25.50 MHz, and said second frequency is lower that said first frequency.

7. The tag as recited in claim 1 further comprising means for deactivating said controller when said energy coupling means receives said transmitted energy below a pre-selected minimum level, said means for mixing being on when said controller is deactivated wherein said sideband signal is continuously formed and re-radiated.

8. The tag as recited in claim 7 wherein said controller comprises a power rectifier connected to said energy coupling means, a logic control unit connected to said power rectifier, a switching unit connected to said means for mixing and to said logic control unit, and a programmable nonvolatile memory module connected to said logic control unit, said memory module comprising storage of said pre-selected stored data code, said code being changeable.

9. The tag as recited in claim 1, wherein said energy coupling means comprises a dipole antenna.

10. The tag as recited in claim 9, wherein said means for mixing comprises a diode connected to said dipole antenna, said controller connected to said diode for momentarily and sequentially shorting said diode according to said pre-selected stored data code.

11. The tag as recited in claim 10 further comprising means for deactivating said controller when said transmitted energy received from said dipole antenna falls below a pre-selected minimum level, said means for mixing being switched on when said controller is deactivated to continue re-radiating said sideband from said energy coupling means.

12. The tag as recited in claim 11 wherein said controller comprises a power rectifier connected to said dipole antenna, a logic control unit connected to said power rectifier, a switching unit connected to said diode and to said logic control unit, and a programmable nonvolatile memory module connected to said logic control unit, said memory module comprising storage of said pre-selected data code, said code being changeable.

13. The tag as recited in claim 12, wherein said first frequency is in the frequency range of about 900 MHz to about 3 GHz and said second frequency is lower that said first frequency.

14. An electronic article surveillance and identification tag, comprising:
   a substrate;
   an inductor formed on said substrate;
   a capacitor formed on said substrate and connected to said inductor, said inductor and said capacitor defining a resonant circuit;
   a magnetic member connected to said inductor and said capacitor; and,
   a controller connected to said magnetic member for momentarily and sequentially shorting said magnetic member according to a pre-selected stored data code associated with an article to be identified.

15. The tag as recited in claim 14, wherein said magnetic member exhibits a magneto-impedance effect by changing impedance when a magnetic field is applied to said magnetic member.

16. The tag as recited in claim 15 further comprising means for deactivating said controller when power received from said inductor and said capacitor falls below a pre-selected minimum level, said magnetic member being non-shorted when said controller is deactivated.

17. The tag as recited in claim 16 wherein said controller comprises a power rectifier connected to said inductor and said capacitor, a logic control unit connected to said power rectifier, a switching unit connected to said magnetic member and to said logic control unit, and a programmable nonvolatile memory module connected to said logic control unit, said memory module comprising storage of said pre-selected data code, said code being changeable.

18. An electronic article surveillance and identification system, comprising:
   interrogation means for generating a first signal at a first frequency and a second signal at a second frequency, said second signal being a magnetic field at a second frequency lower than said first frequency;
   a tag having energy coupling means for receiving said first and said second signals, means for mixing said first and said second signals together and generating a sideband of said first frequency for re-radiating by said energy coupling means, said means for mixing comprising a magnetic member exhibiting a magneto-impedance effect from said second signal, and a controller for switching on and off said means for mixing according to a pre-selected stored data code associated with an article to be identified;
   detection means for detecting said sideband; and
   decoding means for decoding said pre-selected stored data code from said sideband.

19. The system as recited in claim 18 further comprising means to change said pre-selected stored data code.

20. A method of operating an electronic article surveillance and identification system, comprising the steps of:
   providing a tag comprising a tuned circuit and a signal mixing member;
   transmitting a first signal at a resonant frequency of said tuned circuit;
   transmitting a second signal at a frequency that is lower than said first signal, said second signal activating said signal mixing member;
   sequentially turning on and off said signal mixing member according to a pre-selected data code associated with an article to be identified;
   detecting a sideband of said first signal, said sideband generated by said signal mixing member mixing said first and said second signals; and
   decoding said pre-selected data code from said detected sideband.

21. The method of claim 20 wherein the step of providing said tag comprises providing a tuned LC circuit and a magnetic signal mixing member exhibiting a magneto-impedance effect when exposed to a magnetic field; and,
   transmitting said first signal at a resonant frequency of said LC circuit;
   transmitting said second signal at a frequency that is lower than said first signal, said second signal comprising said magnetic field;
   sequentially turning on and off said magnetic signal mixing member according to said pre-selected data code associated with an article to be identified;
   detecting a sideband of said first signal, said sideband generated by said magnetic signal mixing member mixing said first and said second signals; and
   decoding said pre-selected data code from said detected sideband.

22. The method of claim 20 wherein the step of providing said tag comprises providing a tuned dipole antenna and a diode signal mixing member activated by exposure to an electric field; and,
   transmitting said first signal at a resonant frequency of said tuned dipole antenna;
   transmitting said second signal at a frequency that is lower than said first signal, said second signal comprising said electric field;
   momentarily and sequentially disabling said diode signal mixing member according to said pre-selected data code associated with an article to be identified;
   detecting a sideband of said first signal, said sideband generated by said diode signal mixing member mixing said first and said second signals; and
   decoding said pre-selected data code from said detected sideband.

* * * * *